United States Patent [19]

Fub

[11] Patent Number: 4,820,243

[45] Date of Patent: Apr. 11, 1989

[54] BEARING ASSEMBLY FOR A CONTINUALLY VARIABLE CONE-PULLEY BELT DRIVE TRANSMISSION

[75] Inventor: Josef Fub, Elsdorf, Fed. Rep. of Germany

[73] Assignee: Ford Motor Company, Dearborn, Mich.

[21] Appl. No.: 169,670

[22] Filed: Mar. 18, 1988

[30] Foreign Application Priority Data

Jun. 4, 1987 [DE] Fed. Rep. of Germany ....... 3718682

[51] Int. Cl.[4] ............................................. F16H 55/52
[52] U.S. Cl. ........................................ 474/43; 384/461
[58] Field of Search ..................................... 474/43–45, 474/11, 12, 17, 69, 70; 384/461, 906; 464/120–124

[56] References Cited

U.S. PATENT DOCUMENTS

| | | | |
|---|---|---|---|
| 1,622,880 | 3/1927 | Perkins | 384/512 |
| 2,480,968 | 9/1949 | Ronai | 474/43 X |
| 2,789,021 | 4/1957 | Pedersen | 384/461 |
| 3,490,251 | 1/1970 | Roethlisberger | 464/124 |
| 3,705,517 | 12/1972 | Yamanaka et al. | 474/43 X |

FOREIGN PATENT DOCUMENTS

| | | |
|---|---|---|
| 1805102 | 5/1970 | Fed. Rep. of Germany . |
| 2734630 | 10/1978 | Fed. Rep. of Germany . |
| 300378 | 7/1954 | Switzerland ........................ 384/461 |

Primary Examiner—Thuy M. Bui
Attorney, Agent, or Firm—Frank G. McKenzie; Donald J. Harrington

[57] ABSTRACT

A bearing assembly for a continually variable cone-pulley belt drive transmission includes a primary shaft defining a conical pulley that is rotatably mounted, and an axially displaceable conical pulley that is movable along the axis of the primary shaft. A secondary shaft rotatably mounted parallel to the primary shaft defines an axially nondisplaceable conical pulley and an axially displaceable pulley movable parallel to the axis of the secondary shaft. The pulleys on the primary and secondary shafts are drivably connected by an endless drive belt that engages the pulleys on the shaft at a variable radius, whereby the secondary shaft is driven at a variable speed with respect to the primary shaft. The primary and secondary shafts are mounted in the casing of the transmission by a fixed bearing and a loose bearing. The fixed bearing on the primary shaft has its outer race easily displaceable by an axial-linear guide in the form of a group of ball bearings carried in a bearing cage.

12 Claims, 4 Drawing Sheets

BEARING ASSEMBLY FOR A CONTINUALLY VARIABLE CONE-PULLEY BELT DRIVE TRANSMISSION

BACKGROUND OF THE INVENTION

1. Field of the Invention

This invention relates to the belt drive mechanism for a continually variable transmission and, more particularly, pertains to a bearing assembly for rotatably supporting the primary and secondary shafts of such a transmission.

2. Description of the Prior Art

Bearing assemblies for continually variable cone-pulley belt drive transmissions are described in German Pat. Nos. 18 05 102 and 27 34 630. The transmissions include tandem belt drive mechanisms in which the central pulley member is provided with guides by which it is directed along the axis of the corresponding shaft in accordance with the off-track operation of the drive belt. Throughout this specification, the term "off-track operation" means the condition wherein the belt is not centered between the inclined surfaces of the pulley that contact the belt, but instead the belt contacts one of the pulleys at a greater radial and axial distance from the pulley center than its corresponding contact on the cooperating pulley.

SUMMARY OF THE INVENTION

This invention relates to a cone-pulley belt drive transmission having a single endless drive belt connecting a pulley located on a primary shaft and a pulley located on a secondary shaft. The transmission uses a single drive belt, which is susceptible to running on the conical pulley surfaces obliquely and unaligned with the centerline that connects the pulley assemblies on the primary shaft and secondary shaft. This off-track running of the drive belt is the result of axial displacement of one of the conical pulleys in each pair of pulleys located on each of the shafts.

Belt drive transmissions having conical pulleys whose relative positions change continually to alter the gear ratio of the transmission have a constant distance between the primary shaft and the secondary shaft. The length of the drive belt is constant. When the speed ratio is changed, the change in radius of the positions of the drive belt on the primary pulley mechanism and the secondary pulley mechanism is not identical. Because of the inclination of the conical tapered surfaces of the pulley mechanisms, different axial displacements ΔS1 and ΔS2 occur. This difference in axial displacement leads to off-track running of the driving belt. The effect is described as a geometric error which is increased further by the tolerance of the components associated with the mounting position of the fixed cone pulleys inside the gearbox casing.

The off-track running exerts additional stresses on the drive belt, particularly when the drive belt is a thrust member belt of the Van Dorne design, and results in additional friction, which adversely effects the efficiency of the transmission and causes noise at an unacceptable level.

An object of the present invention is to minimize the off-track running of the driving belt of a continually variable conical pulley belt drive transmission. This object is realized in this invention by supporting the primary shaft or secondary shaft of the transmission with a bearing assembly that includes both a fixed bearing and an axially displaceable bearing. The bearing includes an axial-linear guide supported rotatably on the outer surface of the outer race of a ball bearing. The guide is contained within recesses spaced angularly 120° apart about the axis of the bearing assembly. The guide includes a cage having pockets within which the balls of the nondisplaceable bearing are held spaced apart each ball from adjacent balls. The outer race of the fixed bearing is supported on the transmission casing. The displaceable bearing is a deep groove ball bearing having an inner race supported on the primary or secondary shaft and an outer race defining on its outer surface the inner race for the nondisplaceable bearing. A molded circlip, fixed by an outer radial lug in the outer race of the linear guide and by an inner radial lug fixed to the outer race of the deep groove bearing, prevents rotation of the outer race relative to the inner race of the fixed bearing.

Because the fixed bearing has an outer race easily displaceable axially by means of the linear guide, it is possible to correct the off-track running of the driving belt until the axial force component Fa of the belt tension force is greater than the frictional force Fr in the axial-linear guide.

BRIEF DESCRIPTION OF THE DRAWINGS

The invention is described in greater detail with reference to an embodiment illustrated in the accompanying drawings.

DESCRIPTION OF THE PREFERRED EMBODIMENT

Figure 1:
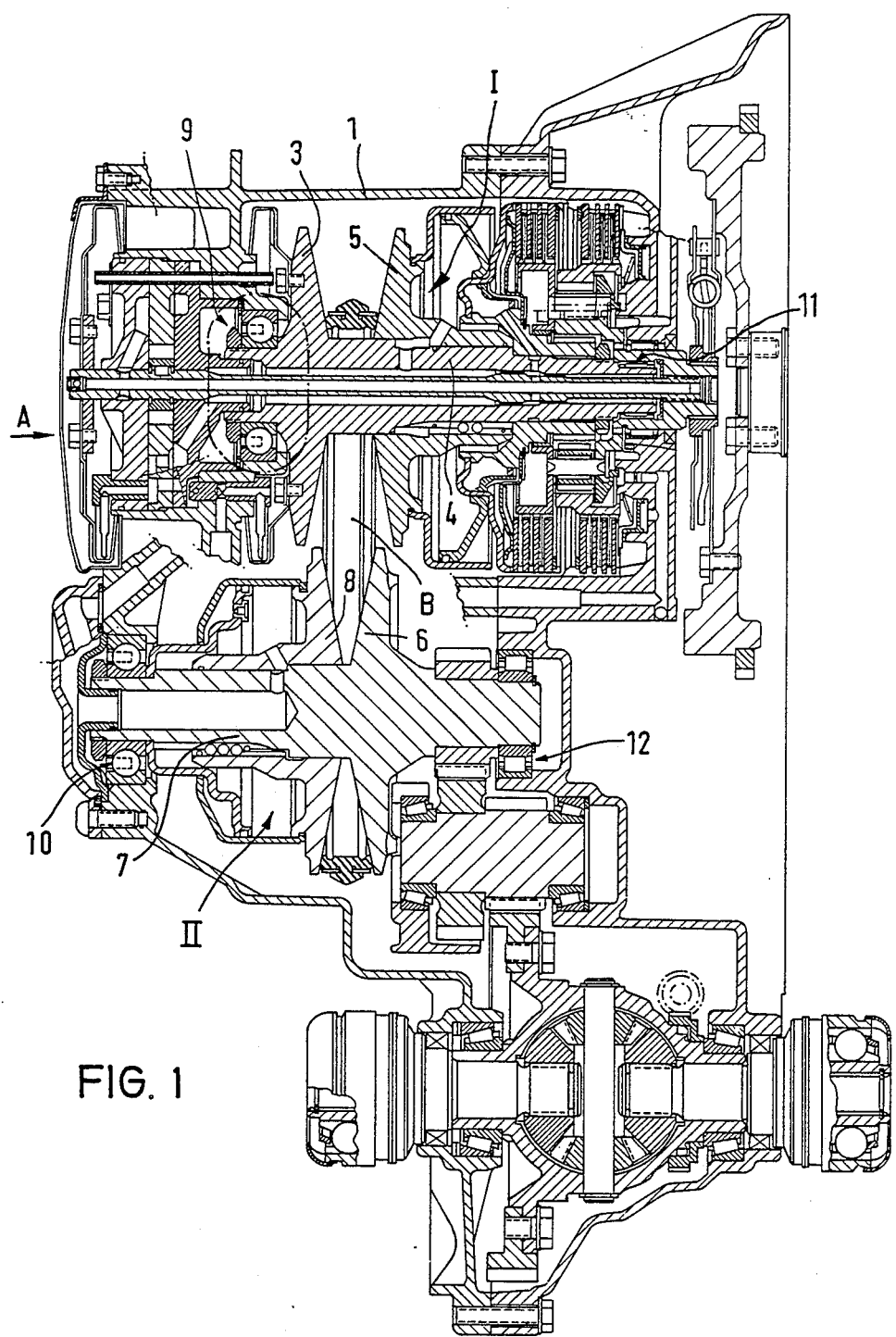
FIG. 1 is a longitudinal cross section through a cone-pulley belt drive transmission having the belt assembly of this invention used on a bearing that supports the primary shaft.

The continually variable cone-pulley belt drive transmission shown in FIG. 1 includes a gear box casing 1, in which cone-pulley assemblies disposed rotationally rigidly on a primary shaft 1 are connected drivably by a driving belt B to a cone-pulley assembly disposed rotationally rigidly on a secondary shaft II. The primary shaft includes an axially nondisplaceable fixed cone pulley 3, fixed to the primary shaft, and an axially displaceable cone pulley 5, whose axial position is changed by way of a hydraulically actuated servo (not shown in detail).

The secondary shaft II includes an axially nondisplaceable cone pulley 6, fixed to the secondary shaft, which supports an axially displaceable adjusting cone pulley 8 whose axial position is changed by a hydraulically actuated servo (not shown in detail).

Both the primary shaft I and the secondary shaft II are rotatably supported on the gear box casing by fixed deep groove ball bearings 9, 10, respectively, and a needle bearing or roller bearing 11, 12.

Figure 2:
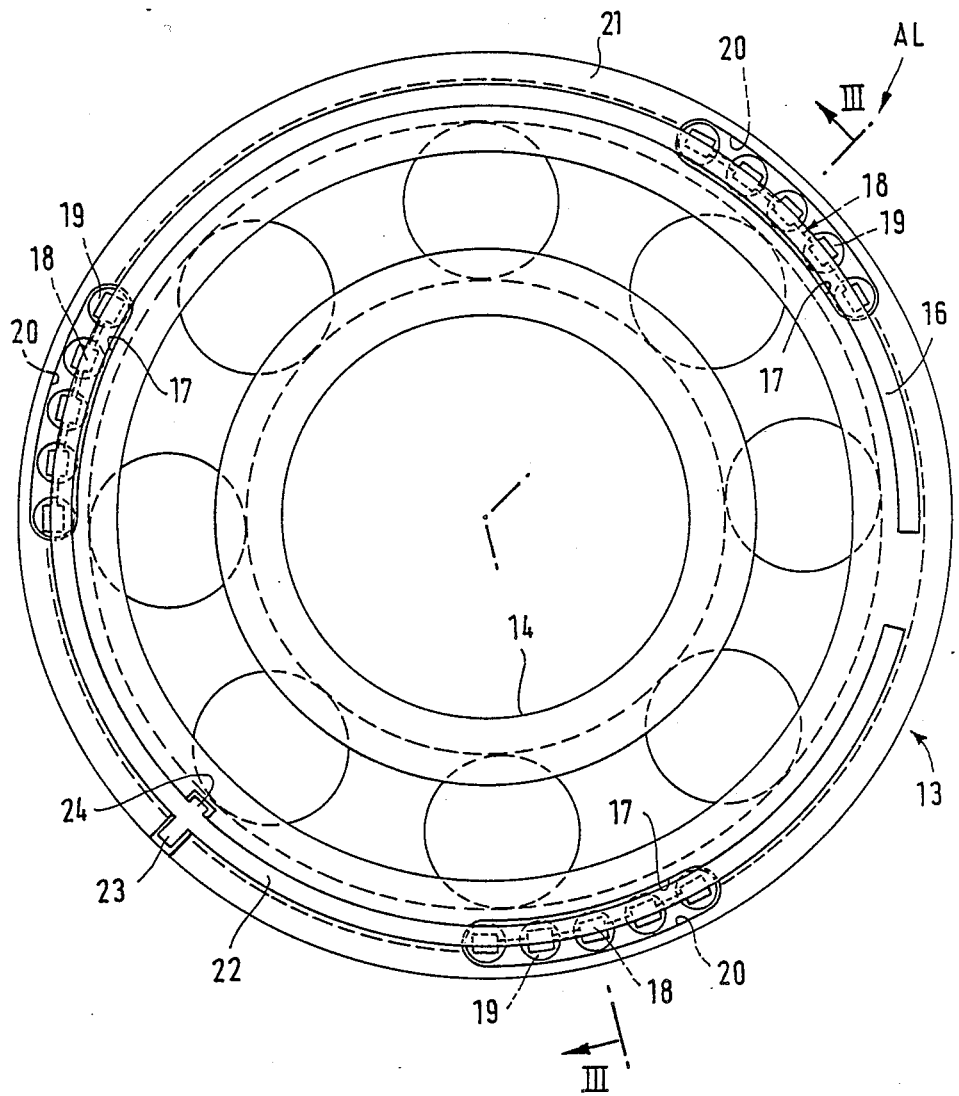
FIG. 2 is an elevation view taken in the direction of arrow A of FIG. 1 looking toward the bearing assembly of this invention.
Figure 3:
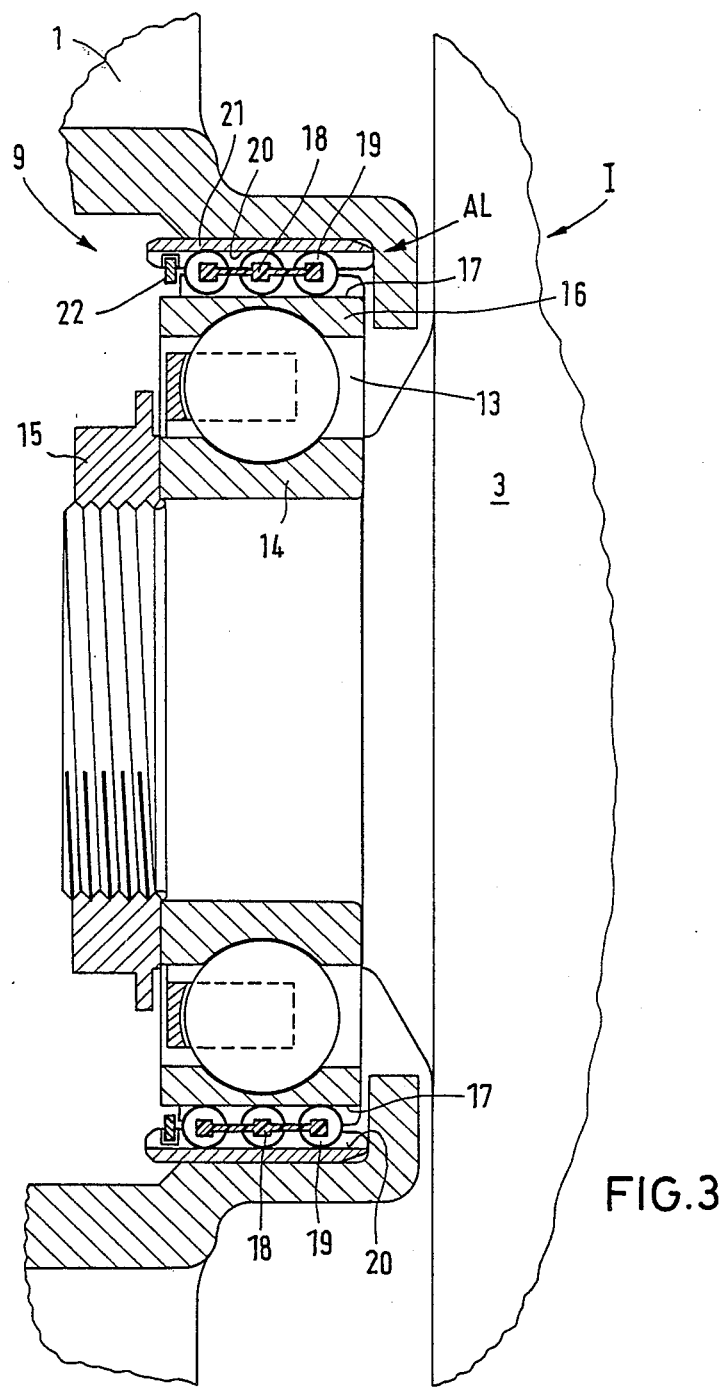
FIG. 3 is a cross section taken at plane III—III in FIG. 2.

Referring now to FIGS. 2 and 3, the fixed bearings 9, 10 that support the fixed cone pulleys 3, 8 on the gearbox casing each includes a modified deep groove ball bearing 13. The inner race 14 is secured to a journal surface of the fixed cone pulley 3 by a fastening nut 15. The outer race 16 of the deep groove ball bearing 13 includes running recesses 17 offset by 120° from one another and spaced about the axis of the bearing. The recesses 17, each extend circumferentially such that a plane ball cage 18 can be located in each recess with multiple balls 19, which are spaced one from another axially and circumferentially by the cage. The balls of the outer bearing assembly are supported on the outside on running recesses 20 of the outer race 21 of an axial-linear guide AL and are supported internally on the recesses 17.

In order that the axial-linear guide AL of the fixed bearing 9 acts only as a linear guide and does not transmit or support any additional moments or forces, a molded circlip 22 is provided between the outer race 16 of the deep groove bearing 13 and the outer race 21 of the axial-linear guide. The radial outer lug 23, fitted within a recess of outer race 16, and a radial inner lug 24, fitted within a recess in the outer race 16 of the bearing 13, prevent the outer race 16 from rotating relative to the outer race 21. The outer race 21 is pressed with an interference fit into the gearbox casing 1. Molded circlip 22 prevents the cage-ball bearing assembly 18, 19 from inadvertently springing out of the running recesses 17, 20. The circlip also acts as a mechanical stop and defines the operating area of the bearing in cooperation with the bearing shoulder formed integrally with the casing.

Figure 4:
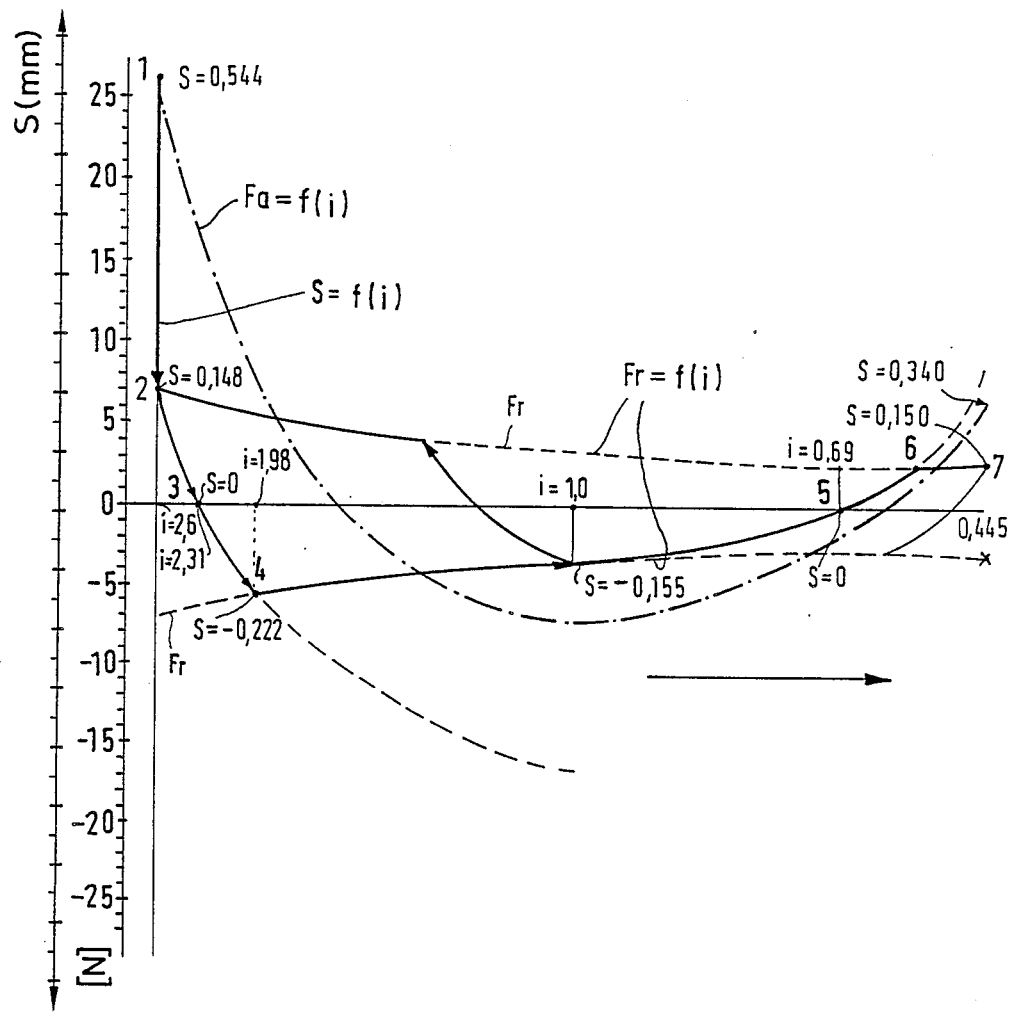
FIG. 4 is a graph of several variables plotted versus a range of transmission speed ratios occurring in the bearing assembly. Specifically, the off-track running of the drive belt, the axial force on the driving belt and the frictional force on the bearing assembly are shown as functions of the transmission speed ratio.

Referring to FIG. 4, the axial force components Fa (dash-dot line) on the driving belt and the friction force component Fr (dash line) on the bearing assembly that arise in the operation of a continually variable transmission of the type shown in FIG. 1 are plotted throughout the speed ratio range produced by the belt drive mechanisms. The axial component of the belt tensile force Fa and the frictional force component Fr (illustrated on a vertical scale in Newton units) effect the off-track running S of the belt B as described next with reference to FIG. 4. At the lowest gear ratio of the belt drive mechanisms, where i=2.6, the belt tensile force Fa is substantially higher than the frictional force Fr. Point 1 represents the off-track running of the belt when the shaft is supported conventionally and point 2 when supported with the bearing assembly of this invention. The distance between points 1 and 2, measured on a vertical axis in millimeters, represents the improvement of the off-track running of the belt from 0.544 mm to 0.148 mm, an improvement of 0.396 mm. At point 3 where the speed ratio is 2.361, the off-track running becomes equal to 0, a particularly favorable result since there is a high degree of stress in the belt at this speed ratio range. At point 4, where the belt drive mechanism produces a speed ratio of 1.98, the off-track running increases slightly to −0.222 mm and declines to −0.155 mm when the speed ratio is 1.0. At point 5 where the speed ratio is 0.69, S drops again to 0. Over the speed ratio range between points 5 and 7, the off-track running increases again, but is only 0.150 compared to 0.340 with the conventional bearing assembly.

When the belt drive mechanism produces reverse drive from the highest speed ratio to the lowest speed ratio, a reduction of the off-track running takes place in a similar manner from point 7 to point 2.

The off-track running of the drive belt is partially compensated automatically with a bearing arrangement of this invention. When the transmission employs a thrust or compression member belt of the Van Dorne-type, the belt is stressed to a lower level because the individual members of the belt are not excessively tensioned and released when running into and out of the cone pulleys. Consequently, the noise which was formerly produced by this action is eliminated because belt friction is reduced with the bearing assembly of this invention. Individual members of the Van Dorne belt when running into and out of the cone pulleys are not required to be as mutually aligned as when a conventional bearing assembly is used to support the shaft.

Having described the preferred embodiment of my invention, what I claim and desire to secure by U.S. Letters Patent is:

1. A bearing assembly for supporting a shaft of a continually variable transmission comprising:
   a first pulley rotatably supported on the shaft and axially nondisplaceable with respect to the shaft, defining a first conical surface;
   a second pulley rotatably supported and displaceable along the axis of the shaft, defining a second conical surface facing the first conical surface, the first and second conical surfaces defining a track adapted to drivably engage a drive belt;
   a transmission casing;
   an inner bearing including an inner race supported on the shaft, an outer race, and a first set of bearing balls located between the inner and outer races, each ball spaced angularly from adjacent balls about the axis of the bearing assembly;
   an outer bearing including an outer race supported on the transmission casing having axially extending recesses spaced angularly, an inner race located on the outer race of the inner bearing having axially extending recesses aligned angularly with the recesses of the outer race of the outer bearing, and a second set of bearing balls located between the inner and outer races of the outer bearing within the recesses of the outer and inner races; and
   means for preventing rotation of the outer race of the inner bearing relative to the outer race of the outer bearing.

2. The bearing assembly of claim 1 wherein the second set of bearing balls includes multiple balls arranged in a row directed along the axis of the bearing assembly.

3. The bearing assembly of claim 1 wherein:
   the outer bearing includes an outer race supported on the transmission casing having axially recesses spaced angularly about the axis of the bearing and extending axially and circumferentially with respect to the axis of the bearing assembly; and
   the second set of bearing balls includes multiple balls arranged in multiple rows directed along the axis of the bearing assembly, each row being spaced circumferentially from the adjacent rows and each row containing multiple balls.

4. The bearing assembly of claim 1 wherein the second set of bearing balls further comprises:
   ball cage means for holding the balls of the second set of bearing balls spaced predetermined distances from one another when located in the recesses between the outer races of the inner and outer bearings.

5. The bearing assembly of claim 1 wherein the shaft includes a shoulder formed adjacent the location of the bearing assembly and a screw thread spaced axially from the shoulder, and further comprising:

a fastening nut threadably engaged with the shaft contacting the inner race of the inner bearing and forcing said inner race against the shoulder.

6. The bearing assembly of claim 1 wherein the transmission casing includes means for restricting axial displacement of the second set of bearing balls at a first axial end of the recesses, and further including means for restricting axial movement of the second set of bearing balls at the axial end of the recesses opposite the first end of the recesses.

7. A bearing assembly for supporting a shaft of a continually variable transmission comprising:

a first pulley rotatably supported on the shaft and axially nondisplaceable with respect to the shaft, defining a first conical surface;

a second pulley rotatably supported and displaceable along the axis of the shaft, defining a second conical surface facing the first conical surface, the first and second conical surfaces defining a track adapted to drivably engage a drive belt;

an inner bearing including an inner race supported on the shaft, an outer race, and a first set of bearing balls located between the inner and outer races, each ball spaced angularly from adjacent balls about the axis of the bearing assembly;

an outer bearing including an outer race supported on the transmission casing having axially extending recesses spaced angularly, an inner race located on the outer race of the inner bearing having axially extending recesses aligned angularly with the recesses of the outer race of the outer bearing, and a second set of bearing balls located between the inner and outer races of the outer bearing within the recesses of the outer and inner races; and means for preventing rotation of the outer race of the inner bearing relative to the outer race of the outer bearing.

8. The bearing assembly of claim 7 wherein the second set of bearing balls includes multiple balls arranged in a row directed along the axis of the bearing assembly.

9. The bearing assembly of claim 7 wherein:

the outer bearing includes an outer race having axially recesses spaced angularly about the axis of the bearing and extending axially and circumferentially with respect to the axis of the bearing assembly; and the second set of bearing balls includes multiple balls arranged in multiple rows directed along the axis of the bearing assembly, each row being spaced circumferentially from the adjacent rows and each row containing multiple balls.

10. The bearing assembly of claim 7 wherein the second set of bearing balls further comprises:

ball cage means for holding the balls of the second set of bearing balls spaced predetermined distances from one another when located in the recesses between the outer races of the inner and outer bearings.

11. The bearing assembly of claim 7 wherein the shaft includes a shoulder formed adjacent the location of the bearing assembly and a screw thread spaced axially from the shoulder, and further comprising:

a fastening nut threadably engaged with the shaft contacting the inner race of the inner bearing and forcing said inner race against the shoulder.

12. The bearing assembly of claim 7 including means for restricting axial movement of the second set of bearing balls at the axial end of the recesses opposite the first end of the recesses.

* * * * *